United States Patent
Boyd et al.

(10) Patent No.: US 8,473,364 B2
(45) Date of Patent: *Jun. 25, 2013

(54) NETWORK REPUTATION AND PAYMENT SERVICE

(75) Inventors: Mark J. Boyd, Mountain View, CA (US); Alexander Grinenko, Cupertino, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/364,197

(22) Filed: Feb. 1, 2012

(65) Prior Publication Data
US 2012/0136753 A1    May 31, 2012

Related U.S. Application Data

(63) Continuation of application No. 11/835,515, filed on Aug. 8, 2007, now Pat. No. 8,126,778.

(60) Provisional application No. 60/919,061, filed on Mar. 19, 2007.

(51) Int. Cl.
G06Q 30/00 (2012.01)
G06Q 30/06 (2006.01)
G06Q 30/02 (2006.01)

(52) U.S. Cl.
CPC ............ *G06Q 30/06* (2013.01); *G06Q 30/0283* (2013.01)
USPC .......................................... 705/26.1; 705/347

(58) Field of Classification Search
USPC ................................. 705/26.1, 347
See application file for complete search history.

(56) References Cited

U.S. PATENT DOCUMENTS

| | | | |
|---|---|---|---|
| 7,455,226 B1 | 11/2008 | Hammond et al. | |
| 7,533,066 B1* | 5/2009 | Robinson et al. | 705/76 |
| 7,802,200 B1* | 9/2010 | Siegel et al. | 715/811 |
| 8,126,778 B2 | 2/2012 | Boyd et al. | |
| 2002/0004751 A1 | 1/2002 | Seki et al. | |
| 2002/0051541 A1 | 5/2002 | Glick | |
| 2002/0120567 A1 | 8/2002 | Caplan | |
| 2003/0093378 A1 | 5/2003 | Silverbrook et al. | |

(Continued)

FOREIGN PATENT DOCUMENTS

| | | |
|---|---|---|
| KR | 1020020026276 A | 4/2002 |
| KR | 1020060120029 A | 11/2006 |
| WO | WO-0237233 A2 | 5/2002 |
| WO | WO-2008115492 A1 | 9/2008 |

OTHER PUBLICATIONS

"About the Amazon Honor System", [Online]. Retrieved from the Internet: <URL: http://zme.amazon.com/exec/varzea/subst/fx/help/how-we-know.html/104-5178630-9145532>, (Copyright 1995-2006).

(Continued)

*Primary Examiner* — Amee A Shah
(74) *Attorney, Agent, or Firm* — Schwegman Lundberg & Woessner, P.A.

(57) ABSTRACT

This document discusses, among other things, example embodiments of a transaction system that may receive, over a network, a first set of transaction data associated with a transaction for an item. In an example embodiment, a reputation application may adjust a rating associated with the transaction when the first set of transaction data indicates a purchase or a return of the item.

17 Claims, 7 Drawing Sheets

U.S. PATENT DOCUMENTS

| | | | |
|---|---|---|---|
| 2004/0068413 | A1 | 4/2004 | Musgrove et al. |
| 2004/0098313 | A1 | 5/2004 | Agrawal |
| 2004/0167853 | A1 | 8/2004 | Sharma et al. |
| 2004/0172260 | A1 | 9/2004 | Junger et al. |
| 2005/0021478 | A1 | 1/2005 | Gautier et al. |
| 2005/0044224 | A1 | 2/2005 | Jun et al. |
| 2005/0051541 | A1 | 3/2005 | Kim |
| 2006/0080238 | A1 | 4/2006 | Nielsen et al. |
| 2006/0149577 | A1 | 7/2006 | Stashluk et al. |
| 2006/0242026 | A1 | 10/2006 | Crespo et al. |
| 2007/0150368 | A1 | 6/2007 | Arora et al. |
| 2007/0271149 | A1 | 11/2007 | Siegel et al. |
| 2007/0299742 | A1 | 12/2007 | Williams et al. |
| 2008/0015972 | A1* | 1/2008 | Walker et al. ............ 705/37 |
| 2008/0027787 | A1 | 1/2008 | Malsbenden et al. |
| 2008/0027874 | A1 | 1/2008 | Monseignat et al. |
| 2008/0040201 | A1 | 2/2008 | Hedlund et al. |
| 2008/0215879 | A1 | 9/2008 | Williams et al. |
| 2008/0235042 | A1 | 9/2008 | Boyd et al. |
| 2008/0235123 | A1 | 9/2008 | Olliphant et al. |

OTHER PUBLICATIONS

"U.S. Appl. No. 11/835,515 Response filed Mar. 3, 2011 to Restriction Requirement mailed Feb. 3, 2011", 7 pgs.

"U.S. Appl. No. 11/835,515, Non Final Office Action mailed May 6, 2011", 14 pgs.

"U.S. Appl. No. 11/835,515, Notice of Allowance mailed Oct. 25, 2011", 5 pgs.

"U.S. Appl. No. 11/835,515, Response filed Jul. 21, 2011 to Non Final Office Action mailed May 6, 2011", 14 pgs.

"U.S. Appl. No. 11/835,515, Restriction Requirement mailed Feb. 3, 2011", 7 pgs.

"U.S. Appl. No. 11/962,511, Appeal Brief filed Jul. 25, 2011", 26 pgs.

"U.S. Appl. No. 11/962,511, Decision on Pre-Appeal Brief Request mailed Jun. 24, 2011", 2 pgs.

"U.S. Appl. No. 11/962,511, Examiner Interview Summary mailed Aug. 10, 2009", 4 pgs.

"U.S. Appl. No. 11/962,511, Examiner's Answer to Appeal Brief mailed Sep. 2, 2011", 19 pgs.

"U.S. Appl. No. 11/962,511, Final Office Action mailed Mar. 2, 2011", 18 pgs.

"U.S. Appl. No. 11/962,511, Final Office Action mailed Jul. 9, 2010", 15 pgs.

"U.S. Appl. No. 11/962,511, Final Office Action mailed Aug. 7, 2009", 16 pgs.

"U.S. Appl. No. 11/962,511, Non-Final Office Action mailed Jan. 8, 2010", 11 pgs.

"U.S. Appl. No. 11/962,511, Non-Final Office Action mailed Jan. 28, 2009", 14 pgs.

"U.S. Appl. No. 11/962,511, Non-Final Office Action mailed Oct. 14, 2010", 16 pgs.

"U.S. Appl. No. 11/962,511, Pre-Appeal Brief Request filed Apr. 25, 2011", 6 pgs.

"U.S. Appl. No. 11/962,511, Response filed Jan. 14, 2011 to Non Final Office Action mailed Oct. 14, 2010", 10 pgs.

"U.S. Appl. No. 11/962,511, Response filed Jan. 14, 2011 to Non-Final Office Action Received Oct. 14, 2010", 10 pgs.

"U.S. Appl. No. 11/962,511, Response filed Apr. 7, 2010 to Non Final Office Action mailed Jan. 8, 2010", 13 pgs.

"U.S. Appl. No. 11/962,511, Response filed Apr. 28, 2009 to Non Final Office Action mailed Jan. 28, 2009", 12 pgs.

"U.S. Appl. No. 11/962,511, Response filed Sep. 8, 2010 to Final Office Action mailed Jul. 9, 2010", 13 pgs.

"U.S. Appl. No. 11/962,511, Response filed Nov. 12, 2009 to Final Office Action mailed Aug. 7, 2009", 11 pgs.

"Definition of widget from Whatis.com", [Online]. Retrieved from the Internet: <URL: http://web.arch ive.org/web/20060218075426/ http://whatis.techtarget.com/defi nition/O,,sid9_gci21>, (Feb. 18, 2006), 3 pgs.

"European Application Serial No. 08742114.5, Extended Search Report mailed Nov. 23, 2011", 7 pgs.

"International Application Serial No. PCT/US2008/003535, International Preliminary Examination Report mailed Oct. 1, 2009", 6 pgs.

"International Application Serial No. PCT/US2008/03535, Search Report mailed Jun. 12, 2008", 4 pgs.

"International Application Serial No. PCT/US2008/03535, Written Opinion mailed Jun. 12, 2008", 5 pgs.

"Korean Application Serial No. 2009-7021696, Notice of Final Rejection mailed Nov. 28, 2011", EN Translation Only, 4 pgs.

"Republic of Korea Serial Application No. 2009-7021696—Office Action Received", 6 pgs.

"Republic of Korea Serial Application No. 2009-7021696—Office Action Response filed Jul. 18, 2011", (31 pgs).

Anonymous, "A New Approach for embedding web user interfaces into swing applications", Research Disclosure, Mason Publications, vol. 504 No. 63, (Apr. 1, 2006).

Garrett, Jesse James, "Ajax: A New Approach to Web Application", http://www.adaptivepath.com, Retrieved Feb. 11, 2010, (Feb. 18, 2005), 1-5.

Mesbah, Ali, et al., "An Architechtural Style for Ajax", Software Architechture, WICSA 07, The Working IEEE/IFIP Conference on IEEE, (Jan. 1, 2007), 9.

"U.S. Appl. No. 11/962,511, Reply Brief filed Nov. 1, 2011", 5 pgs.

"European Application Serial No. 08742114.5, Response filed Jun. 19, 2012 to Search Report mailed Nov. 23, 2011", 11 pgs.

"Korean Application Serial No. 2009-7021696, Notice of Preliminary Rejection mailed Jul. 23, 2012", with English translation of claims, 9 pgs.

"Korean Application Serial No. 2009-7021696, Response filed Sep. 24, 2012 to Office Action mailed Jul. 23, 2012", with English translation of claims, 17 pgs.

* cited by examiner

NETWORK REPUTATION AND PAYMENT SERVICE

RELATED APPLICATIONS

This application is a continuation of U.S. application Ser. No. 11/835,515 filed Aug. 8, 2007 now U.S. Pat. No. 8,126,778 entitled, "NETWORK REPUTATION AND PAYMENT SERVICE," which application is related to and hereby claims the priority benefit of U.S. Provisional Patent Application No. 60/919,061 filed Mar. 19, 2007, and which applications are incorporated in their entirety herein by reference.

FIELD

This application generally relates to network publication systems. Example embodiments relate to a method and system for a network reputation and payment service.

BACKGROUND

As online activity increases, users increasingly communicate and participate in a variety of transactions and commerce with each other. Some buyers and sellers (e.g., individuals and merchants) transact with each other based on good faith and whatever knowledge they may have about each other as transacting parties and/or members of a transacting community. Service providers providing transaction systems may facilitate commercial transactions by performing roles such as hosting the publication of items, maintaining user accounts, monitoring transaction activities, and tracking user reputations. Typical transaction systems may restrict sellers to posting items on sites or pages affiliated with the transaction system. Additionally, these transaction systems may not adequately track user and item reputations or process refunds for digital items.

BRIEF DESCRIPTION OF THE DRAWINGS

Example embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of one or more embodiments. It will be evident, however, to one skilled in the art that these and other embodiments may be practiced without these specific details.

Figure 1:
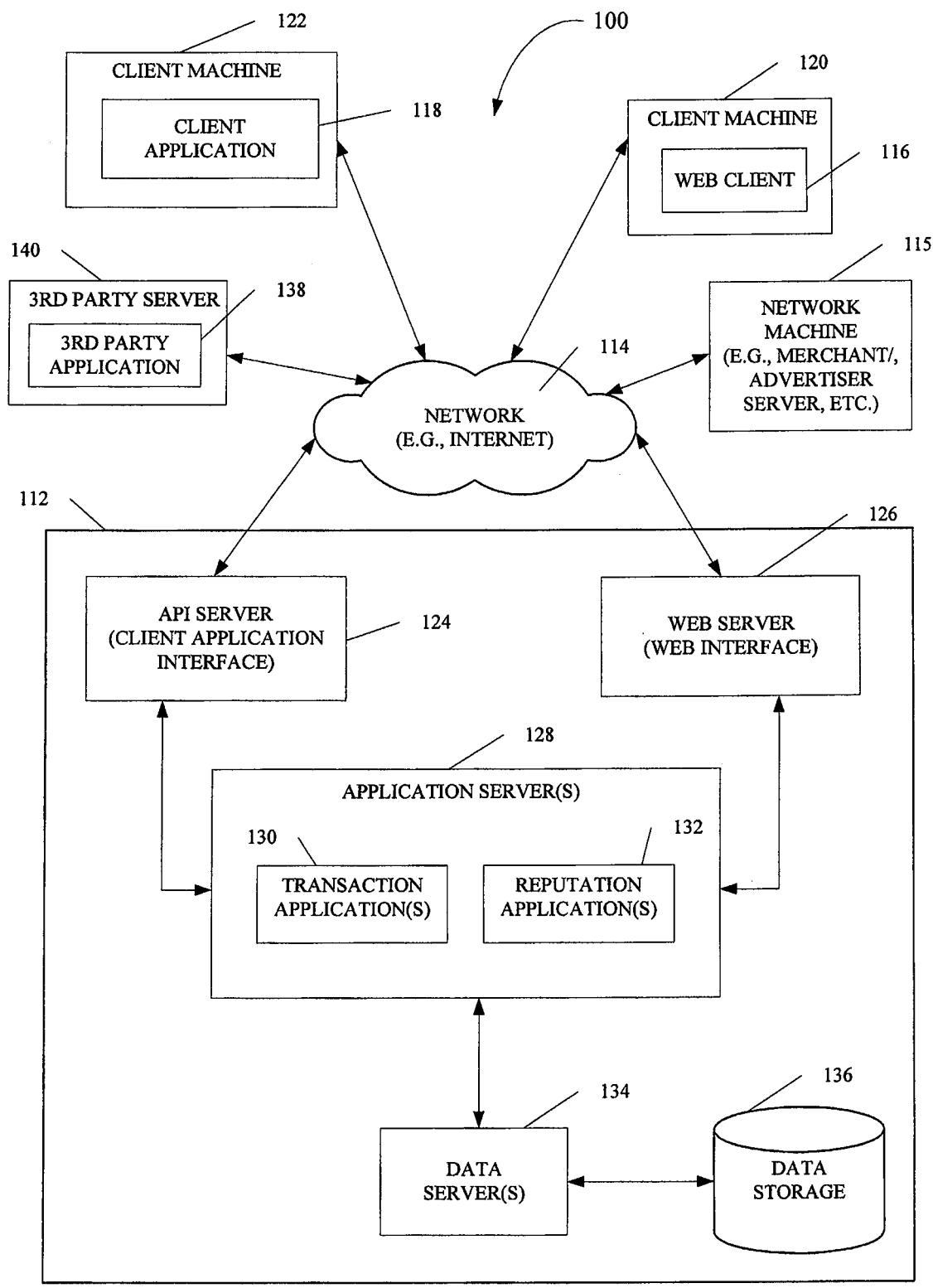
FIG. 1 is a block diagram illustrating a network transaction system having a client-server architecture, in accordance with an example embodiment.

The transaction system 100 shown in FIG. 1 may be a publishing system where clients may communicate, view, search, and exchange data with the publishing system. For example, the transaction system 100 may include various applications for interfacing with client machines and client applications that may be used by users (e.g., buyers and sellers) of the system to facilitate the purchase of items such as digital goods (e.g., files, links, etc.).

A data exchange platform, in an example form of a network-based transaction system 112, may provide server-side functionality, via a network 114 (e.g., the Internet) to one or more clients. The one or more clients may include users that utilize the network-based transaction system 112 as a transaction intermediary to facilitate the exchange data over the network 114 corresponding to user transactions. User transactions may include receiving and processing items, as well as item related data and user data from a multitude of users, such as item data, payment data, reputation data, item return data, item review data, feedback data, etc. A transaction intermediary such as the network-based transaction system 112 may include one or all of the functions associated with a payment service and other functions and services associated with transactions between one or more parties. For simplicity, these functions are discussed as being an integral part of the network-based transaction system 112; however, it can be appreciated that these functions may be provided by transaction systems remote from the network-based transaction system 112. For example, two transacting parties may utilize a third party hosting and/or payment service (e.g., third party server 140 described below) outside of the network-based transaction system 112.

In various embodiments, the data exchanges within the transaction system 100 may be dependent upon user selected functions available through one or more client/user interfaces (UIs). The UIs may be associated with a client machine, such as a client machine 120 utilizing a web client 116. The web client 116 may be in communication with the network-based transaction system 112 via a web server 126. The UIs may also be associated with a client machine 122 utilizing a client application 118, or a third party server 140 hosting a third party application 138. It can be appreciated in various embodiments that the client machine 120, 122 may be associated with various user types, such as a buyer, a seller, a payment service provider or an advertising service provider, each in communication with the network-based transaction system 112 and optionally each other. The buyers and sellers may be any one of individuals, merchants, etc.

In an embodiment, an advertiser using a network machine 115 (e.g., advertiser server, etc.) may be in communication with at least one of the network-based transaction system 112 and various other network machines (e.g., client machine 120). The network machine 115 may provide dynamic data to serve client machines that access specific network addresses (e.g., URL (uniform resource locator)) directly or indirectly via the network-based transaction system 112. For example, the dynamic data may be one or more advertisements that a user using a client machine may click on and receive a transaction amount or credit in return. The credit may then be used by the user to purchase other items, such as digital files, physical goods, etc.

The network-based transaction system 112 may include data exchange functions to collect item related data from buyers and may selectively provide portions of that data to sellers and other service or item providers. In an embodiment, these functions allow a seller (e.g., a merchant) to receive payment and/or item return data from the network-based transaction system 112. The item data may include location data, user data, and payment data, and/or other item related data, etc. For example, the item data may include a destination address associated with the network-based transaction system 112 brokering the item, data indicating which user (seller) to pay, how much to pay, the location of the item identifier (e.g., web page thumbnail) that describes the item, and, in the case of a digital item, the location of the digital item (e.g., the URL of a digital item on the network machine 115).

Turning to an embodiment of the network-based transaction system 112 architecture, an application program interface (API) server 124 and a web server 126 are coupled to and provide programmatic and web interfaces respectively to one or more application servers 128. The application servers 128 host one or more transaction applications 130 and reputation applications 132.

An application program interface (API) server 124 and a web server 126 provide programmatic and web interfaces to one or more application servers 128. The application servers 128 may host one or more other applications, such as transaction applications 130 and reputation applications 132. The application servers 128 may be coupled to one or more data servers 134 that facilitate access to one or more storage devices, such as the data storage 136.

The transaction applications 130 may provide a number of payment and refund processing modules to facilitate processing payment information associated with a buyer purchasing an item from a seller or a buyer returning an item. The transaction and reputation applications 130, 132 may include various modules to provide a number of functions and services to users that access the network-based transaction system 112. For example, these services may include, inter alia, digital wallet management, public registration of items, seller creation of listings, low cost to buyer/seller, cross domain item reputation, dynamic pricing, dynamic reputation of items based on purchases and refunds, single click refunds, cross domain seller reputation, iconography instead of explicit price, squatters rights, consignment options, fraud prevention, negative pricing for advertising (e.g., credit per view) and/or other functions or services, etc.

FIG. 1 also illustrates an example embodiment of a third party application 138, which may operate on a third party server 140 and have programmatic access to the network-based transaction system 112 via the programmatic interface provided by the API server 124. For example, the third party application 138 may utilize various types of data retrieved from the network-based transaction system 112 and support one or more features or functions normally performed at the network-based transaction system 112. For example, the third party application 138 may receive a copy of all or a portion of the data storage 136 that includes transaction and item data and act as the transaction intermediary between the buyer and seller with respect to functions such payment, refund, and reputation functions. Additionally, in another embodiment, similar to the network-based transaction system 112, the third party application 138 may also include modules to perform operations pertaining to payment, refunds, reputation, etc. In yet another embodiment, the third party server 140 may collaborate with the network-based transaction system 112 to facilitate transactions between buyers and sellers, such as by sharing data and functionality pertaining to item, transaction, reputation value data, etc.

Figure 2:
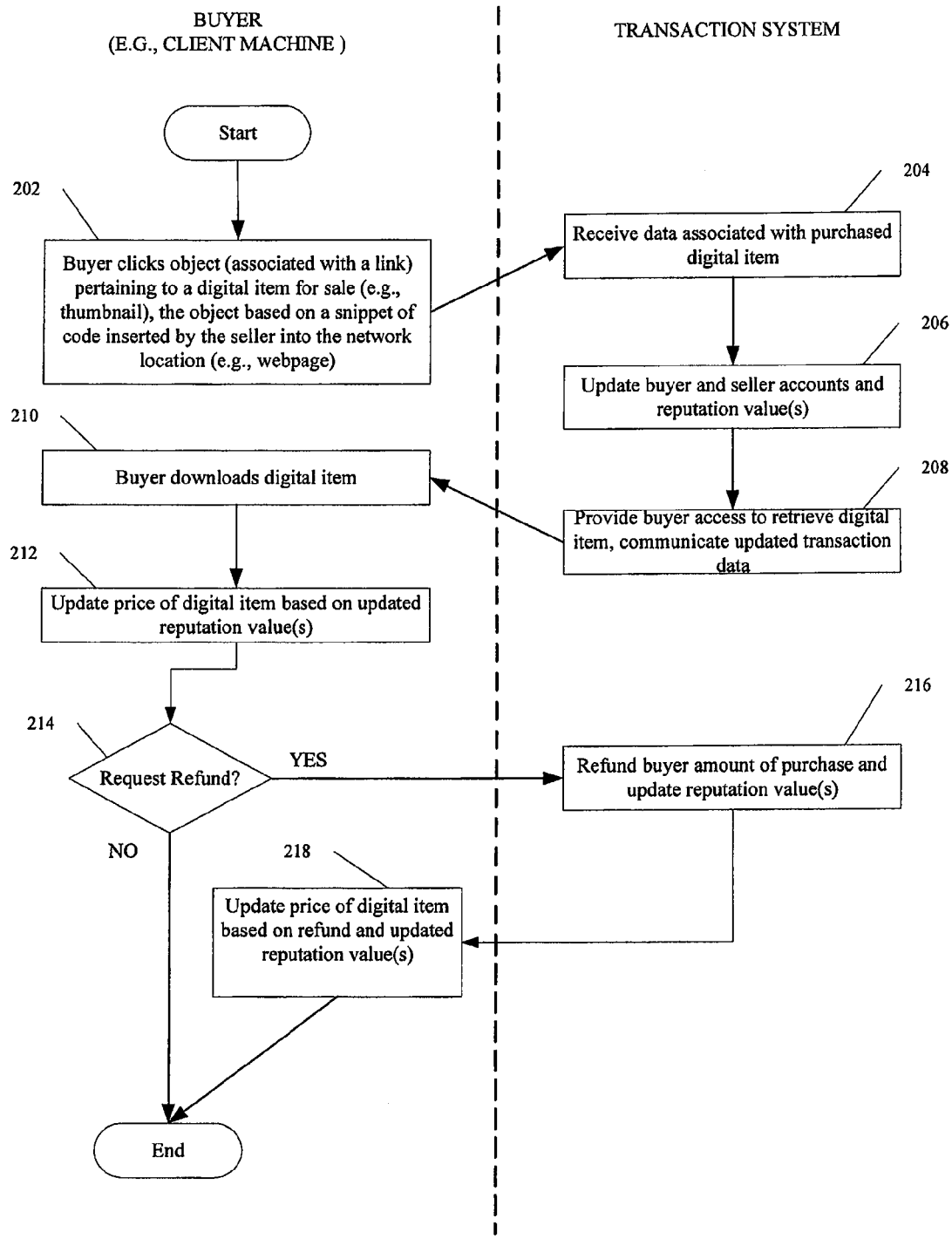
FIG. 2 illustrates a flow chart of an example embodiment of operations pertaining to a buyer (user) selecting and purchasing an item in a transaction system.

FIG. 2 illustrates a flow chart of an example embodiment of operations pertaining to a user (e.g., a buyer) selecting and purchasing an item in a transaction system. In an embodiment, the transaction system, at least in part, is integrated into the network-based transaction system 112 as described above with reference to FIG. 1. The buyer may use a client machine (e.g., client machine 120, 122) and associated components to interact with the network-based transaction system 112 to select and purchase an item (e.g., digital good, etc.).

In various embodiments, a user may view items offered for sale by a seller at a network location, such as a web page. The seller may have a level of control over the content of the web page and, in an embodiment; the seller may insert code (e.g., a "snippet") into the source code of the web page to display the item for sale. For example, a user may cut and paste a piece of HTML (Hypertext Markup Language) code associated with an item for sale into an HTML page within the World Wide Web and then become the seller of the item. In this example, the seller need not control the server of the HTML page but the seller has the ability to edit the page itself.

The item may be a digital good such as a video file or a photo file that may be represented as an object on the page (e.g., a thumbnail image or limited quality image, an audio file, audio sample and/or any other multimedia file, etc.). As discussed above with reference to FIG. 1, the snippet may include item data, such as a destination address associated with the network-based transaction system 112 brokering the item, data indicating which user (e.g., seller) to pay, how much to pay, the location of the item identifier (e.g., web page thumbnail) that describes the item, and in the case of a digital item, the location of the digital item (e.g., URL of a digital item on the network machine 115), etc.

Returning to FIG. 2, at operation 202, a buyer indicates a selection via a user interface (e.g., mouse, keyboard, joystick, voice control, and/or any other user interface device, etc.) of a digital item represented on a user display (e.g., web page) to purchase the digital item.

At operation 204, the transaction system receives transaction data that includes at least a portion of the item data associated with the buyer selection. It can be appreciated in various embodiments that different data formats (e.g., cookies, text files, etc.), protocols (hypertext transfer protocol, etc.) and means of communication (e.g., Internet, local area network (LAN), dial-up, etc.) may be used to transfer the item data to the transaction system.

At operation 206, the transaction system updates the buyer and seller accounts and a rating associated with the transaction. In an example embodiment, the value of the rating is indicated via a reputation value. An item reputation, buyer reputation, seller reputation, the reputation of a Web page or a valuation of any other identifiable portion of transactions in the system may be dependent on one or more reputation value. In an example embodiment, the reputation value increases as the number of purchases increases. Conversely, the reputation value decreases as the number of refunds increases.

In an example embodiment, an increase in the reputation value may increase an item reputation which may in turn raise the price of an item. A decrease in the reputation value may decrease the item reputation and the price of an item.

Returning to the example of the digital item, the transaction system may revise the pricing of the digital item based on the number of purchases and number of refunds associated with the item. In an example embodiment, the more the digital item is purchased (e.g., multiple sales of a digital photo), the more the reputation and/or price of the item is increased; conversely, the more an item is refunded, the more the reputation and/or price of the item is decreased. At operation 208, the transaction system provides the buyer access to retrieve or otherwise acquire the digital item and communicates updated reputation value information back to the buyer's machine.

In example embodiments including a digital item (e.g., picture or movie file), the transaction system may host the file to be downloaded or redirect the buyer to another location for the download. In example embodiments including an item that is a physical good or service the transaction system may facilitate an exchange associated with the goods or services between the buyer and the seller. Other example embodiments may not include the transaction systems facilitation of the exchange.

Once the buyer downloads the digital item at operation 210, the price of the item may be updated based on an updated reputation value in operation 212. If the buyer requests a refund, at operation 214, the request is communicated to the transaction system; otherwise the process ends. At operation 216, the buyer is refunded the amount of the purchase and updates are made to buyer and seller accounts and the reputation value(s). In various embodiments, there may be one or more rules that govern when and how often a buyer may request a refund. For example, a buyer may not be eligible for a refund after a threshold number of days or may only be able to receive a refund for a fixed percentage of the buyer's purchases (e.g., 10%). At operation 218, the price of the digital item (which e.g., dependent on the item reputation) is updated according to the received updated reputation value data based on the refund from operation 216.

There may be a variety of processes and/or algorithms for determining an increase in reputation value and consequently an item's price, in an example embodiment. For example, an item may be listed at a beginning price of $0.02, and if purchased by one user, the beginning price increases by $0.02 to a current price of $0.04. If another two users purchase the item, the beginning price increases another $0.02 for a total current price of $0.06. If another four users purchase the item, the beginning price increases another $0.02 for a total current price of $0.08. Therefore, the current price (P) of the item may be represented by:

$$P=c+f(x)$$

where
c is a beginning price, and
f(x) is a function of the number of purchases (or value of purchases),
where $$f(x)=c^*(\log_2 \#purchases).$$

In the above example, c=$0.02 and f(x)=$0.02*(log$_2$ #purchases). In an embodiment, the above described function may be deployed to impose a high cost for "shilling" behavior. Shilling behavior may include artificially purchasing one's own item to increase one or more reputation value (e.g., item reputation) parameter, such as item cost or rating.

The transaction system may similarly use processes and/or algorithms for decreasing a reputation value, such as item reputation and consequently, the price of the item. For example, if a first user gets a refund for an item, the item price may be reduced by $0.02. When two more users get refunds for the item, the price may be reduced by another $0.02, and so on, etc. In this example, the change in price of an item (ΔP) is represented by:

$$\Delta P=c-f(x)$$

where
c is a beginning price, and $$f(x)=c^*(\log_2 \#returns).$$

Again a function may be chosen so that a number of users (e.g., competitor(s)) wanting to degrade an item's reputation) will have difficulty because the item may become more affordable (and e.g., increase competition) as an item's price value decreases.

In various embodiments, a variety of functions may be devised to adjust reputation value, both up and down. As previously discussed above, a reputation value may cause an effect upon item reputation, reputation of the buyer, reputation of the seller, reputation of a web page or a reputation of any other identifiable portion of the transaction.

Figure 3:
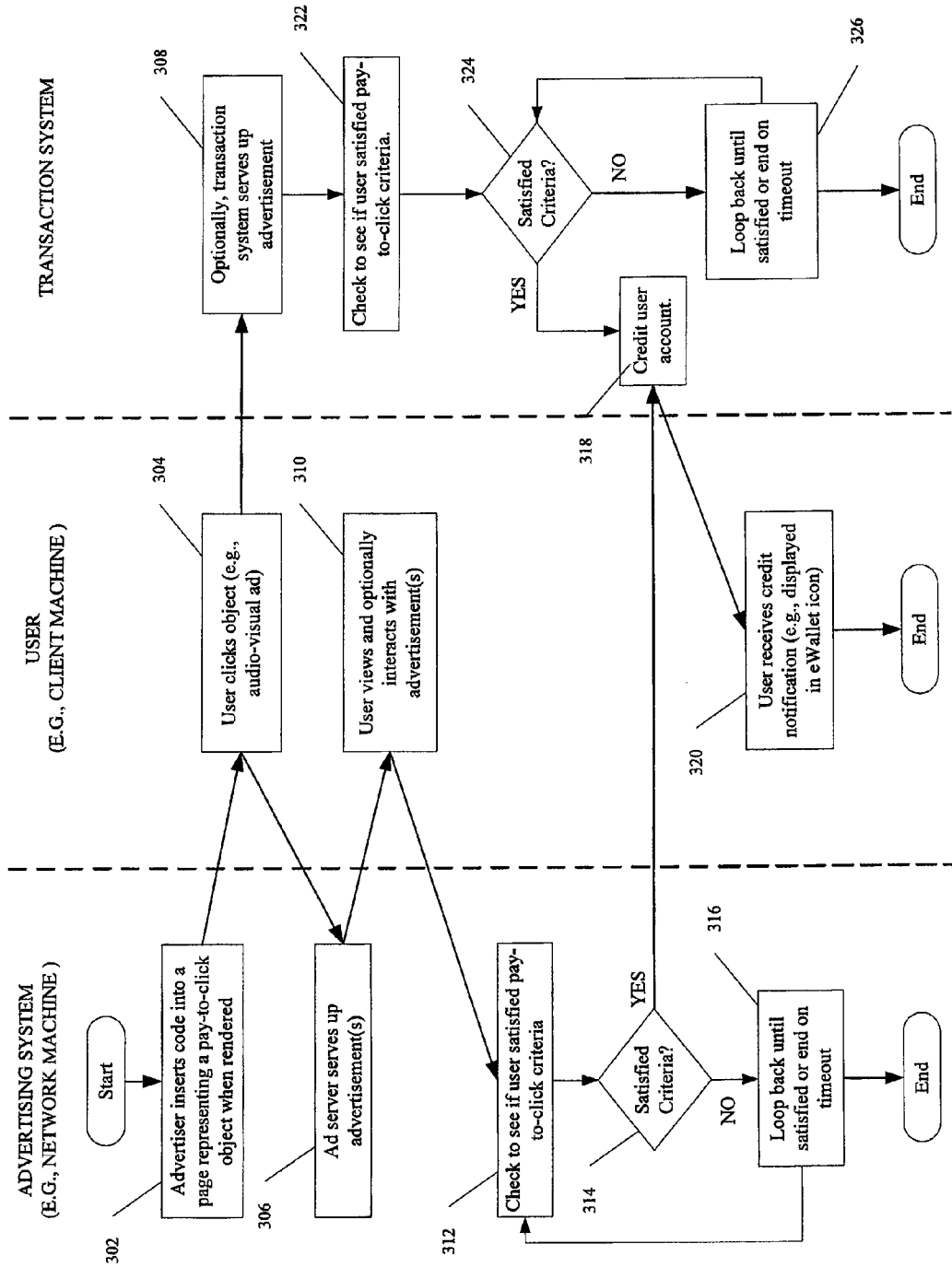
FIG. 3 is a flow chart of an example embodiment of a transaction system working in conjunction with an advertising system to pay or provide a user credit (pay-to-click) to view the advertisements associated with the advertising system.

FIG. 3 is a flow chart of an example embodiment of a transaction system working in conjunction with an advertising system to pay or provide a user credit (e.g., pay-to-click) to view or otherwise interact with the advertisements associated with the advertising system. In various embodiments, this payment or credit may be used to purchase items as described herein.

At operation 302, an advertising system inserts or provides code to be placed into a web page or other user application that renders a viewable object to a user of a client machine. The viewable object may include a digital photo thumbnail, text, or other multimedia that represents the subject matter intended to induce the user to click through to receive additional information (e.g., advertisement, etc.). As discussed above with reference to FIG. 1, the client machine may be served the web page including the code from the advertising system or the transaction system at operation 304, or the code may be resident in a stand-alone application installed on the client machine that is in communication with the advertising system and configured to receive advertising data (or other data) dynamically.

Returning to FIG. 3, at operation 304, the user interacts with (e.g., clicks) the object representing, in this embodiment, the example pay-to-click advertisement. In an embodiment, the advertising system, at operation 306, serves up the advertisement in response to the click. Optionally, in another embodiment, the transaction system, at operation 308, may serve up the advertisement to the user, where the advertisement may have been retrieved from storage or provided dynamically from the advertising system (not shown).

At operation 310, the user views and optionally interacts with the advertisement. For example, the advertisement may be interactive and include a series of questions or selectable choices (e.g., choosing automobile features, other options related to the advertisement or other selectable choices, etc.) resulting in additional data being presented to the user. Various pay-per-click schemes may be used during this interaction. For example, the user may be paid (or receive transaction credit) for the initial click through or may be paid for each or for a combination of interactions after the initial click through.

The advertising system at operation 312, or optionally the transaction system at operation 322, checks to determine whether the user has satisfied minimum criteria for payment or credit. For example, a user may click through and interact with at least one option or screen in the advertisement to qualify for payment or credit. If the criteria are satisfied, at operation 314 or optionally 324, then the transaction system that maintains the user's account, at operation 318, pays or credits the user, which is received at operation 320. In various embodiments, the payment or credit may be updated on the user's interface (e.g., an eWallet object) or require additional user interaction to view.

If the selection criteria is not satisfied, then at operation 316 and optionally at operation 326, the process loops back to check if the criteria is satisfied (operation 312, 324) or ends if a timeout occurs indicating the user has not clicked through or interacted in a timely fashion. It is to be appreciated that there are various options for a user not satisfying the criteria, including for example, prompting the user for input, restarting the initial advertisement, or other available options, etc.

Figure 4:
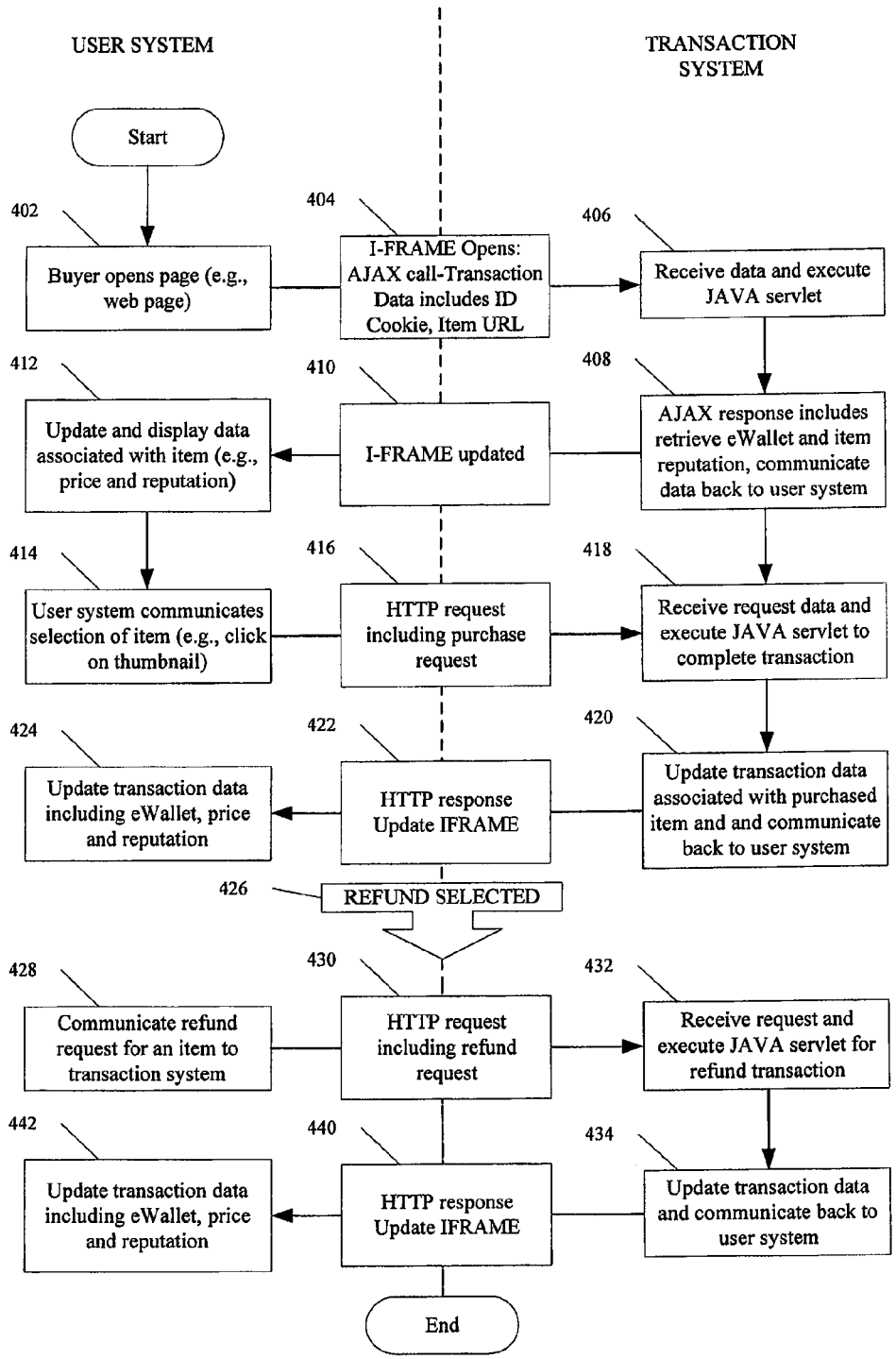
FIG. 4 illustrates a flow chart of an example embodiment of operations pertaining to a buyer (user) selecting and purchasing an item in a transaction system over a network.

FIG. 4 illustrates a flow chart of an example embodiment of operations pertaining to a buyer (user) selecting and purchasing an item in a transaction system over a network, such as the Internet. At operation 402, a buyer opens a web page that includes a piece of code inserted by a seller, the piece of code (e.g., a snippet) representing an item or items for sale. The execution of the snippet causes, at block 404, an "I-Frame" to open and make an AJAX (asynchronous JavaScript and XML) call to exchange data with the transaction system without refreshing the web page. This data may include, but may not be limited to, item transaction data, item identification data, user identification data, item URI (uniform resource identifier), item URL, reputation value data, or other data, etc.

The transaction system, at operation 406, receives the data from the AJAX call and in response executes an application (e.g., a JAVA servlet). At operation 408, the application retrieves data to communicate back to the user system, such as user transaction data (e.g., eWallet balance) and reputation value data for an item transaction. In various embodiments, the reputation value may include the price of the item itself. The reputation value data may include a reputation scale (e.g., a number from 1 to 10, 1 being the lowest reputation). Alternatively or additionally, the reputation value data may include a reputation value for the buyer, the seller, the item, or any combination thereof.

The updated I-Frame, at operation 410, is communicated from the transaction system to the user system in an I-Frame update. At operation 412, item and user data is updated to reflect current price, reputation, and buyer credit balance (e.g., eWallet balance). At operation 414, the buyer selects (e.g., via mouse click) the portion of the webpage representing the item, such as a thumbnail for a digital item (e.g., photo/multimedia file). This representation may have been included in the original snippet of code inserted by the seller or dynamically updated from operations 408 and 410. In this example, the communication is in the form of an HTTP (Hypertext Transfer Protocol) request at block 416 and is received at the transaction system where a JAVA servlet is executed to complete transaction at operation 418. This includes communicating, at operation 420, transaction data associated with the purchased item, such as updated price and reputation value data included in an HTTP response at block 422. At operation 424, the updated data is received and the webpage is updated. The update data may include user data associated with updating the user's eWallet, price data, and reputation value data.

At decision 426, a refund operation may be selected via the user system, such as a user clicking a refund button on the web page at operation 428 to generate an HTTP request including the refund request at block 430. The refund request is received at the transaction system at operation 432, and a JAVA servlet is executed for a refund transaction. At operation 434, the transaction data is updated at the transaction system and communicated back to the user system in an HTTP response at block 440. The web page at the user system is updated, at operation 442, to reflect the refund. This update may include an update to the buyer's eWallet and a change in the price and reputation of the item returned. As previously discussed, in various embodiments, the price may be the reputation value for the item or it may be a distinct value, and the buyer and seller may also have a reputation value. The seller's reputation value may also be associated with the item's price or reputation value.

Figure 5:
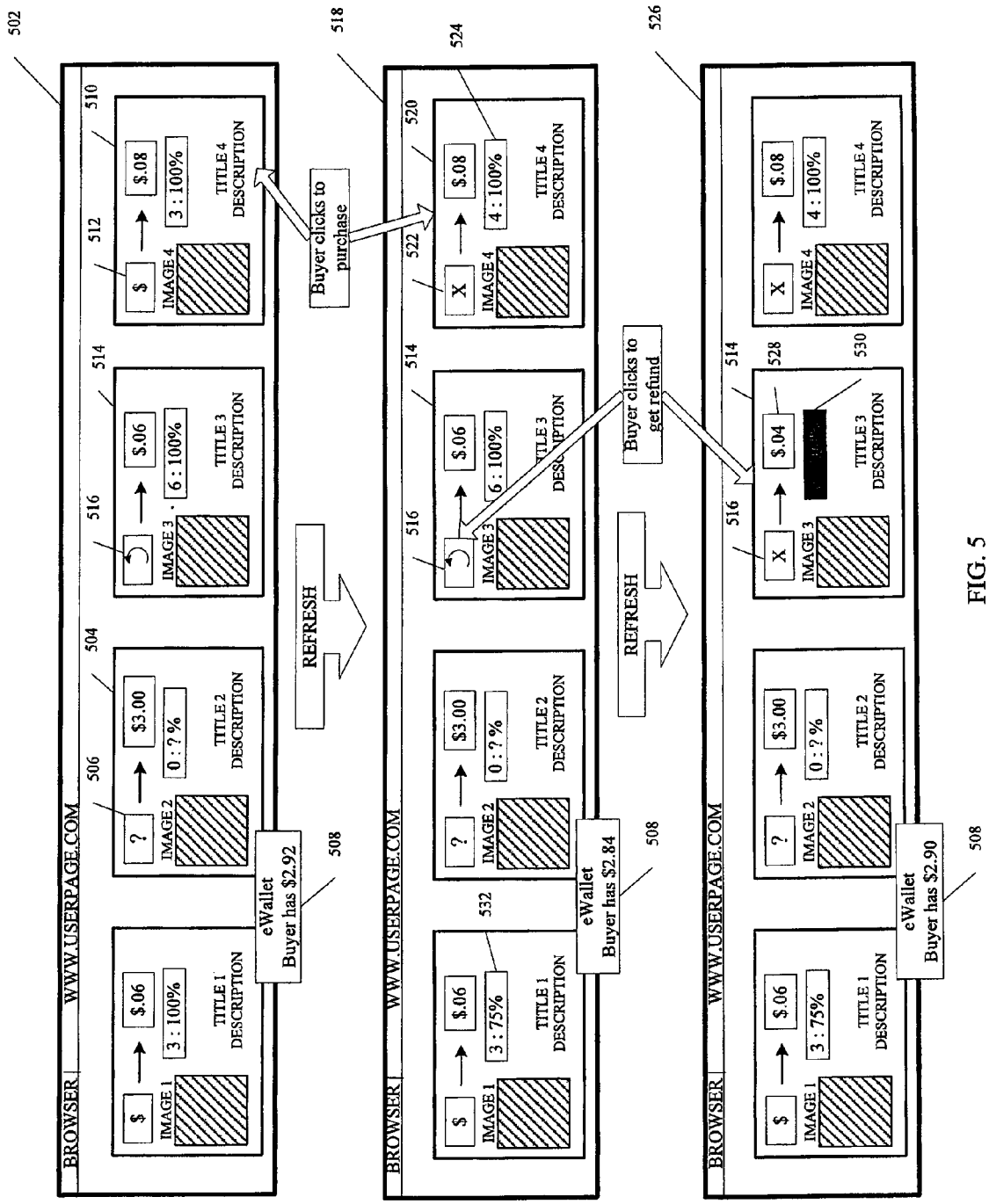
FIG. 5 is an example embodiment of webpage screenshots illustrating digital photos (items) being purchased and returned.

FIG. 5 is an example embodiment of webpage screenshots illustrating digital photos (e.g., items) being purchased and returned. The items as listed may include title, description, item status, item cost, transaction status and an image, such as a digital photograph. In an embodiment, four icons are used to represent four possible options (e.g., status) with respect to an item listed on a page. Referring to transaction status 506 in item 504 of screenshot 502, the first icon is a question mark, "?", indicating that the user is not logged in or that there are not enough funds available. The transaction status 506 includes the "?" symbol because item 504 has a cost of $3.00 and a wallet 508 associated with the buyer has $2.92, which is less than the cost of the item 504. The second icon is the "$" indicating the item may be purchased. For example, see item 510 and transaction status 512. The third icon is a circle-arrow, as shown in transaction status 516 of item 514. The transaction status 516 indicates that the item has already been purchased and a refund may be requested. The fourth icon is an "X" symbol, as shown in screenshot 518, item 520, transaction status 522, indicating the item is not available for a refund. In various embodiments, different items may be associated with different rules that determine whether a refund is possible. For example, some items may have a time limit within which a buyer may request a refund, or a buyer may be allowed to obtain refunds on a limited portion of items (e.g., 10% of all purchased), while other items may not be ever be eligible for a refund.

In an embodiment, a mouse over of a wallet may reveal a users identity and wallet amount. For example, a mouse over of wallet 508 may reveal the user "Buyer" has $2.92 in their wallet. A mouse over of an item may show that the item is available but hasn't been purchased within the a recorded time; a mouse over of an item may alternatively or additionally indicate a number of items purchased over a period of time and/or a period of time recorded for the sale of a certain number of items (e.g., two items were sold in the last ten days and/or e.g., the last ten items were sold in the last 23 days).

When a status symbol with "$" icon appears in an item, clicking the item may result in a purchase, including a dynamic decrement of the price from the user's wallet, download of the digital good, and appropriate change to the item rating/price. For example, the status 512 indicates item 510 is available for purchase. The buyer clicks the item 510, when the screenshot 502 is updated to screenshot 518, item status 524 has been updated to reflect that the item has been purchased four times. The wallet 508 has been updated to reflect a $0.08 debit for the purchase.

The item status indicators (e.g., item status 524) indicate The % indicates the percent of non-refunded volume purchases over the total number of purchases. For example, if 40 units worth of purchases were made, and 2 units were refunded, the percent by volume would be 95% and the item status 532 on screenshot 518 may indicate 95%.

As discussed above, a buyer may wish to obtain a refund for an item previously purchased. As shown in screenshot 518, item 514 has a transaction status 516 (circle-arrow) indicating the purchase price of item 514 may be refunded.

Screenshot 526 illustrates the item 514 after a refund. The price 528 has been reduced by $0.02, and thus, in this example, the reputation value has been reduced by $0.02. The transaction status 516 now indicates (with the "X" symbol) that the user may not obtain another refund for this item. Additionally, the wallet 508 has been updated in screenshot 526 to show the refund of $0.06 with respect to the wallet 508 in screenshot 518. In this example embodiment, the item status 530 on screenshot would decrease the percent volume, reflecting the new ratio of non-refunds and the total number of purchases.

In an embodiment, if a user has already purchased the item, the user may click on the item and download the item again without being charged again, and without changing the item rating. In various embodiments, a user (e.g., a seller) may be prompted to register an item prior to offering it for sale. As discussed above, in order to make selling as easy as possible and minimize capacity needed to register/list an item for sale, sellers may cut and paste a snippet of code onto their web page to begin selling (e.g., www.userpage.com as illustrated in screenshot 502). The snippet may include only such information as may be needed to sell an item, such as the seller identification (in our example an email address), the location (URL) of the item thumbnail, and the location (URL) of the item itself.

In an example embodiment, the snippet has a master I-Frame and I-Frame information. For example:
<iframe src="http://labs.arch.ebay.com/j2ee/GClick/GClickPublicIFrame.html ?email=alogrin@yahoo.com &pict=http://g.fool.com/art/seminars/cs_getouthead.gif &file=http://g.fool.com/art/seminars/dovvnloads/debtworkbook.pdf" height="170" width="250" frameborder="NO" scrolling="no"></iframe>

Figure 6:
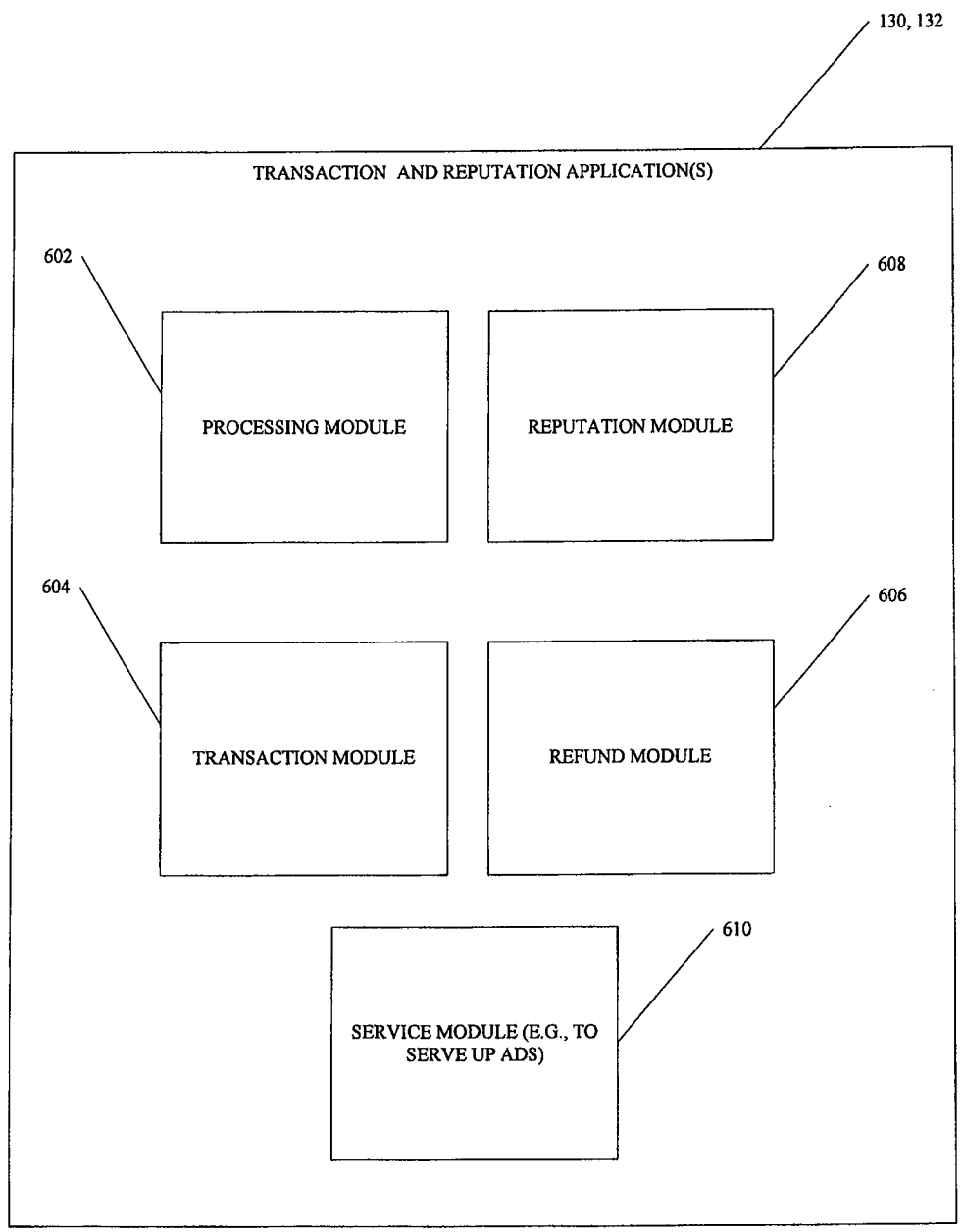
FIG. 6 is a block diagram illustrating an example embodiment including various modules associated with the functionality of the transaction and reputation applications.

FIG. 6 is a block diagram illustrating an example embodiment including various modules associated with the functionality of the transaction and reputation applications 130, 132 described in reference to FIG. 1. An example embodiment of the functionality of applications 130, 132 is described in the processes illustrated in FIGS. 2, 3 and 4. The modules illustrated in FIG. 6 are by way of example only, and it is to be appreciated that the number of modules associated with the transaction and reputation applications 130, 132 may vary in different example embodiments. The applications 130, 132 may be included in their entirety or in part in a transaction system, user system, advertising system, or any combination thereof.

A processing module 602 may receive data for further processing. This data may include, but not be limited to, item transaction data, item identification data, user identification data, item URI, item URL, advertising data, reputation value data, etc. A transaction module 604 may process and use the received data to facilitate the purchasing of an item, such as the item 510 as described with reference to FIG. 5. Additionally, in an embodiment associated with a pay-to-click advertisement system, the transaction module 604 may process and use the received data to pay a user for clicking on a specific item or items on a page as discussed with reference to the processes described in FIG. 3. A refund module 606 may process and use the received data to facilitate the refund of an item previously purchased, such as the item 514 as described with reference to FIG. 5.

A reputation module 608 may be used to adjust the reputation value of an item purchased or returned. In an embodiment, this reputation value associated with an item may be the price of the item. In various embodiments, there may be multiple reputation values affected by a transaction. For example, a reputation value for the item, a reputation value for one or both of the buyer and seller, and a reputation value for the network location (e.g., web page) hosting the sale of the item (e.g., snippet location), or any combination thereof.

A service module 610, in various embodiments associated with a pay-to-click advertisement system, may be used to serve up advertisements or other data dynamically to a network location (e.g., webpage URL) in response to the page being loaded in a user system or other user interaction with elements of the webpage.

Figure 7:
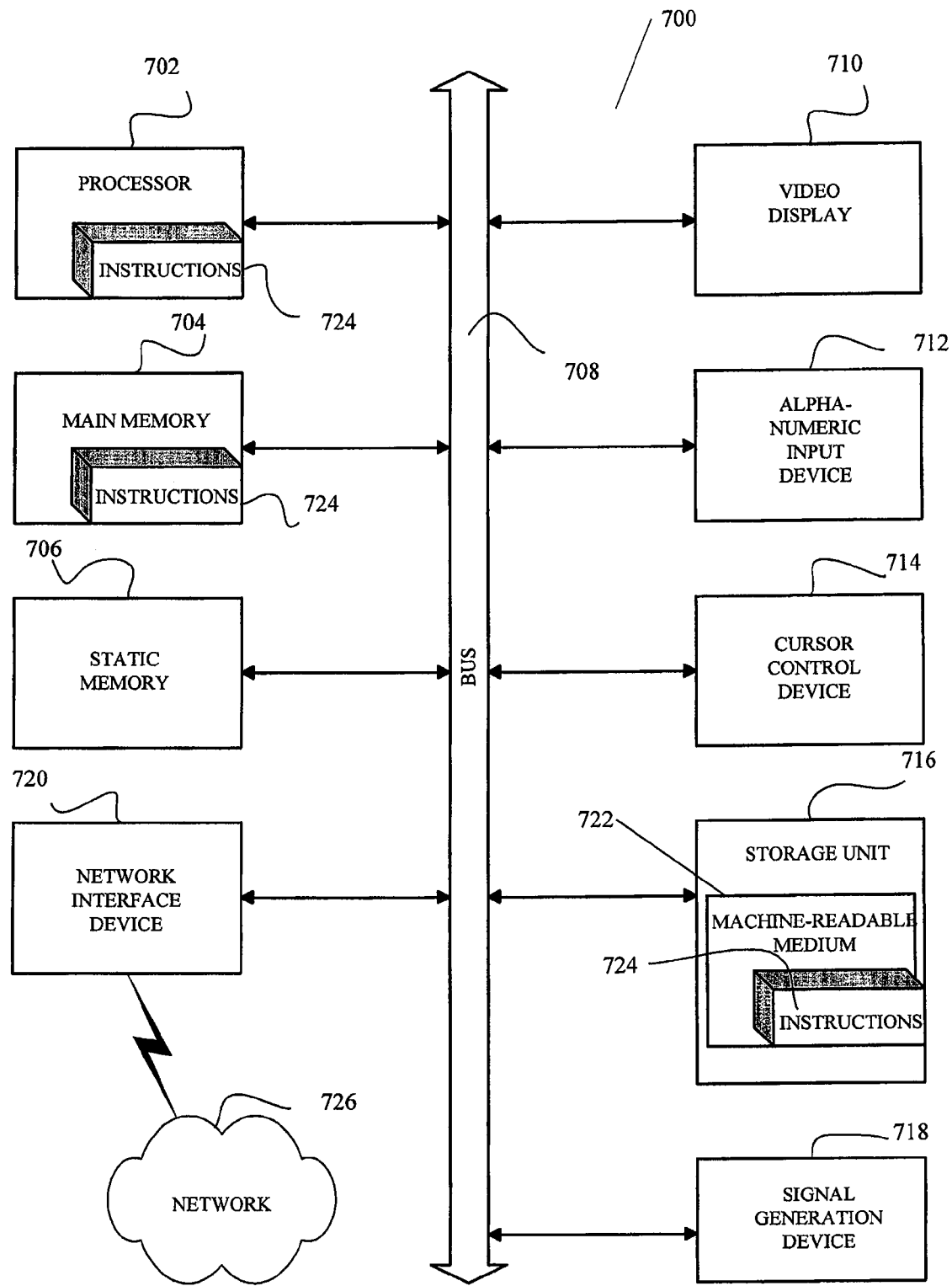
FIG. 7 shows a diagrammatic representation of a machine in the example form of a computer system within which are a set of instructions for causing the machine to perform any one or more of the methodologies discussed herein.

FIG. 7 shows a diagrammatic representation of a machine in the example form of a computer system 700 within which are a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a storage unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the example methodologies or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although various embodiments have been described with reference to specific example embodiments, it will be evident that various modifications and changes may be made to these embodiments without departing from the broader spirit and scope of what is claimed. Accordingly, the specification and drawings are to be regarded in an illustrative rather than a restrictive sense.

What is claimed is:

1. A method comprising:
   detecting a transaction for an item; and
   adjusting, using one or more processors, a rating based on a type of the transaction, the adjusting including:
   updating an item reputation for the item by increasing the item reputation for the item based on the transaction being a purchase transaction of the item and decreasing the item reputation for the item based on the transaction being a refund transaction for the item, the increasing or the decreasing of the item reputation resulting in a corresponding change to a price of the item.

2. The method of claim 1, wherein the adjusting of the rating includes using a non-linear function that takes as an input a number of purchases associated with the item.

3. The method of claim 1, wherein the adjusting of the rating includes using a non-linear function that takes as an input a number of refunds associated with the item.

4. The method of claim 1, wherein the adjusting of the rating caused by the purchase transaction or the refund transaction is based on a logarithmic function.

5. The method of claim 1, wherein the adjusting of the rating includes adjusting a user reputation that includes at least one type of reputation selected from a buyer reputation and a seller reputation.

6. The method of claim 1, wherein the change to the price is calculated by c−f(x) where c is a beginning price of the item and f(x)=c*($\log_2$ of a number of refunds).

7. The method of claim 1, wherein the change to the price is calculated by c+f(x) where c is a beginning price and f(x)=c*($\log_2$ of a number of purchases).

8. The method of claim 1, further comprising:
   detecting that a refund for the item is restricted by a rule; and
   enforcing the rule to restrict the refund for the item, the enforcing of the rule including limiting the refund to a percentage of the purchase.

9. The method of claim 1, wherein the adjusting of the rating comprises adjusting a reputation of a web page associated with the transaction.

10. A machine-readable storage medium containing instructions which, when executed by a processing system, cause the processing system to perform operations comprising:
    receiving first transaction data associated with a transaction for an item; and
    adjusting a rating based on a type of the transaction, the adjusting including:
    updating an item reputation for the item by increasing the item reputation for the item based on the transaction being a purchase transaction of the item and decreasing the item reputation for the item based on the transaction being a refund transaction for the item, the increasing or the decreasing of the item reputation resulting in a corresponding change to a price of the item.

11. The machine-readable storage medium of claim 10, wherein the adjusting of the rating includes using a non-linear function that takes as an input a number of purchases associated with the item.

12. The machine-readable storage medium of claim 10, wherein the adjusting of the rating includes using a non-linear function that takes as an input a number of refunds associated with the item.

13. The machine-readable storage medium of claim 10, wherein the adjusting of the rating caused by the purchase transaction or the refund transaction is based on a logarithmic function.

14. The machine-readable storage medium of claim 10, wherein the adjusting of the rating includes adjusting a user reputation that includes at least one type of reputation selected from a buyer reputation and a seller reputation.

15. A system comprising:
    a processor of a machine;
    a processing module to detect an initiation of a transaction for an item; and
    a reputation module to adjust, using the processor of the machine, a rating based on a type of the transaction, the reputation module to adjust the rating by adjusting an item reputation for the item by increasing the item reputation for the item based on the transaction being a purchase transaction of the item and decreasing the item reputation for the item based on the transaction being a refund transaction for the item, the increasing or the decreasing of the item reputation resulting in a corresponding change to a price of the item.

16. The system of claim 15, wherein the reputation module is to adjust the rating using a non-linear function that takes as an input at least one of a number of purchases associated with the item or a number of refunds associated with the item.

17. The system of claim 15, wherein the reputation module is to adjust the rating by adjusting a user reputation, wherein the user reputation includes at least one type of reputation selected from a buyer reputation and a seller reputation.

* * * * *